(12) United States Patent
Hashimoto et al.

(10) Patent No.: US 11,969,830 B2
(45) Date of Patent: Apr. 30, 2024

(54) ALUMINUM ALLOY BRAZING SHEET

(71) Applicant: Kobe Steel, Ltd., Kobe (JP)

(72) Inventors: Tatsuki Hashimoto, Tochigi (JP);
Kenichiro Yoshida, Tochigi (JP); Yuji Shibuya, Tochigi (JP); Akihiro Tsuruno, Tochigi (JP); Yoshikazu Miyano, Aichi (JP); Hajime Sugito, Aichi (JP); Michiyasu Yamamoto, Aichi (JP); Masayuki Makita, Aichi (JP); Arisu Fujii, Aichi (JP); Shin Takewaka, Aichi (JP); Hayaki Teramoto, Aichi (JP); Koichi Yamamoto, Aichi (JP); Toshihide Ninagawa, Aichi (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 17/759,889

(22) PCT Filed: Jan. 29, 2021

(86) PCT No.: PCT/JP2021/003435
§ 371 (c)(1),
(2) Date: Aug. 1, 2022

(87) PCT Pub. No.: WO2021/157500
PCT Pub. Date: Aug. 12, 2021

(65) Prior Publication Data
US 2023/0117687 A1    Apr. 20, 2023

(30) Foreign Application Priority Data

Feb. 4, 2020   (JP) .................................. 2020-017456
Nov. 4, 2020   (JP) .................................. 2020-184647

(51) Int. Cl.
*B23K 35/02*    (2006.01)
*B23K 1/00*     (2006.01)
(Continued)

(52) U.S. Cl.
CPC ........ *B23K 35/0238* (2013.01); *B23K 1/0012* (2013.01); *B23K 35/288* (2013.01);
(Continued)

(58) Field of Classification Search
None
See application file for complete search history.

(56) References Cited

U.S. PATENT DOCUMENTS 8,227,091 B2 * 7/2012 Ueda ...................... F28F 19/06
                                                            428/654
8,524,377 B2 * 9/2013 Kobayashi .............. C22C 21/00
                                                            428/933

(Continued)

FOREIGN PATENT DOCUMENTS

CN   1982047 A    6/2007
CN   101787469 A  7/2010
(Continued)

OTHER PUBLICATIONS

International Search Report dated Apr. 20, 2021 in PCT/JP2021/003435 (with English translation), 5 pages.
(Continued)

*Primary Examiner* — Daniel J. Schleis
(74) *Attorney, Agent, or Firm* — Oblon, McClelland, Maier & Neustadt, L.L.P.

(57) ABSTRACT

An aluminum alloy brazing sheet including a core material, a sacrificial material provided on one surface of the core material, a brazing filler material provided on the other surface side of the core material, and an intermediate layer provided between the core material and the brazing filler (Continued)

material. The core material contains Si: 0.30 to 1.00 mass %, Mn: 0.50 to 2.00 mass %, Cu: 0.60 to 1.20 mass %, Mg: 0.05 to 0.80 mass %, and Al. The sacrificial material contains Si: 0.10 to 1.20 mass %, Zn: 2.00 to 7.00 mass %, Mn: 0.40 mass % or less, and Al. The intermediate layer contains Si: 0.05 to 1.20 mass %, Mn: 0.50 to 2.00 mass %, Cu: 0.10 to 1.20 mass %, and Al.

19 Claims, 2 Drawing Sheets

(51) Int. Cl.
*B23K 35/28* (2006.01)
*C22C 21/10* (2006.01)
*B23K 101/14* (2006.01)
*B23K 103/10* (2006.01)
*B23K 103/16* (2006.01)

(52) U.S. Cl.
CPC .......... *C22C 21/10* (2013.01); *B23K 2101/14* (2018.08); *B23K 2103/10* (2018.08); *B23K 2103/166* (2018.08)

(56) References Cited

U.S. PATENT DOCUMENTS

| | | | |
|---|---|---|---|
| 10,518,363 B2* | 12/2019 | Yoshino | B23K 35/0238 |
| 11,408,690 B2* | 8/2022 | Ando | C22C 21/10 |
| 2007/0246509 A1 | 10/2007 | Koshigoe et al. | |
| 2010/0112370 A1 | 5/2010 | Ueda et al. | |
| 2015/0165564 A1* | 6/2015 | Ahl | C22C 21/02 |
| | | | 228/101 |

FOREIGN PATENT DOCUMENTS

| | | |
|---|---|---|
| JP | 2006-131923 A | 5/2006 |
| JP | 2008-111143 A | 5/2008 |
| JP | 2011-68933 A | 4/2011 |
| JP | 5276476 | 5/2013 |
| WO | WO 2008/078598 A1 | 7/2008 |

OTHER PUBLICATIONS

Written Opinion of the International Searching Authority dated Apr. 20, 2021 in PCT/JP2021/003435 (with English translation), 6 pages.
Executive Committee of 50th Anniversary Project, Commemorative Publishing Committee, "Aluminum Products and Manufacturing Technologies," The Japan Institute of Light Metals, Oct. 31, 2001, pp. 408-411.
Supplementary European Search Report dated Apr. 28, 2023, in European Patent Application No. 21751311.8—10 pages.

\* cited by examiner

ALUMINUM ALLOY BRAZING SHEET

CROSS REFERENCE TO RELATED APPLICATIONS

This application is a National Stage entry under 35 U.S.C. § 371 of PCT/JP2021/003435, filed on Jan. 29, 2021 and claims priority to Japanese Patent Application No. 2020-017456, filed on Feb. 4, 2020 and Japanese Patent Application No. 2020-184647, filed on Nov. 4, 2020. The entire contents of each are incorporated herein by reference.

TECHNICAL FIELD

The present invention relates to an aluminum alloy brazing sheet, and more particularly, to an aluminum alloy brazing sheet used for an automobile heat exchanger or the like.

BACKGROUND ART

An automobile heat exchanger is generally produced by shaping, assembling, and brazing an aluminum alloy sheet that is lightweight and has excellent thermal conductivity. In order to achieve all of the strength, brazing property, and corrosion resistance, a brazing sheet made of a core material, a brazing filler material, and a sacrificial material is used as the aluminum alloy sheet. In addition, an Al—Mn alloy having a relatively high strength is mainly used for the core material, and an alloy element such as Mg, Cu, and Si is added to the core material in order to improve the strength.

However, when Mg is added to the core material even in a small amount such as 0.1 mass %, there is a problem that Mg diffuses into the brazing filler material due to heating during brazing and reacts with a flux to significantly reduce the brazing property.

Therefore, as a method for improving a brazing property of a brazing sheet containing Mg added to a core material, for example, Patent Literature 1 proposes a brazing sheet by which diffusion of Mg is prevented by providing an Mg diffusion prevention layer (intermediate layer) between a core material and a brazing filler material, thereby improving the brazing property.

CITATION LIST

Patent Literature

Patent Literature 1: JP-A-2006-131923

SUMMARY OF INVENTION

Technical Problem

Based on the viewpoint of increasing the strength, a method of adding Mg to a core material is very effective. However, in the case where the amount of Mg added to the core material is increased, it is impossible to prevent a decrease in a brazing property even in the configuration having the intermediate layer provided as disclosed in Patent Literature 1, and as a result, it is difficult to achieve both the strength and the brazing property. In particular, in the technique according to Patent Literature 1, the brazing property on a surface of a sacrificial material is not sufficiently studied, and it is difficult to prevent the occurrence of a brazing failure at a joint portion between the sacrificial material and the brazing filler material.

Accordingly, an object of the present invention is to provide an aluminum alloy brazing sheet by which both the post-brazing strength and the brazing property can be achieved.

Solution to Problem

In order to solve the above-described problems, the present inventors focused attention on components of an aluminum alloy brazing sheet having a four-layer configuration of a sacrificial material-core material-intermediate layer-brazing filler material, and intensively studied the influence of the components on the above-described problems.

As a result, the present inventors have found that, by regulating a content of Mn in the sacrificial material to be equal to or less than the predetermined value, a brazing property can be improved even if a large amount of Mg is contained in the core material in order to improve the strength. Specifically, the present inventors have found that the fluidity of a molten brazing filler on the surface of the sacrificial material during brazing can be significantly improved by reducing the content of Mn in the sacrificial material, and as a result, the brazing property can be improved while achieving an effect of improving post-brazing strength based on Mg in the core material.

That is, an aluminum alloy brazing sheet in the present invention includes: a core material; a sacrificial material provided on one surface of the core material; a brazing filler material provided on the other surface side of the core material; and an intermediate layer provided between the core material and the brazing filler material, and the core material includes Si: 0.30 mass % or more and 1.00 mass % or less, Mn: 0.50 mass % or more and 2.00 mass % or less, Cu: 0.60 mass % or more and 1.20 mass % or less, Mg: 0.05 mass % or more and 0.80 mass % or less, with the remainder being Al and unavoidable impurities, the sacrificial material includes Si: 0.10 mass % or more and 1.20 mass % or less, Zn: 2.00 mass % or more and 7.00 mass % or less, Mn: 0.40 mass % or less, with the remainder being Al and unavoidable impurities, and the intermediate layer includes Si: 0.05 mass % or more and 1.20 mass % or less, Mn: 0.50 mass % or more and 2.00 mass % or less, Cu: 0.10 mass % or more and 1.20 mass % or less, with the remainder being Al and unavoidable impurities.

Advantageous Effects of Invention

The aluminum alloy brazing sheet in the present invention can exhibit excellent post-brazing strength and an excellent brazing property.

DESCRIPTION OF EMBODIMENTS

Hereinafter, embodiments for carrying out an aluminum alloy brazing sheet (hereinafter, referred to as a brazing sheet as appropriate) in the present invention are described with reference to the drawings as appropriate.

[Aluminum Alloy Brazing Sheet]

Figure 1:
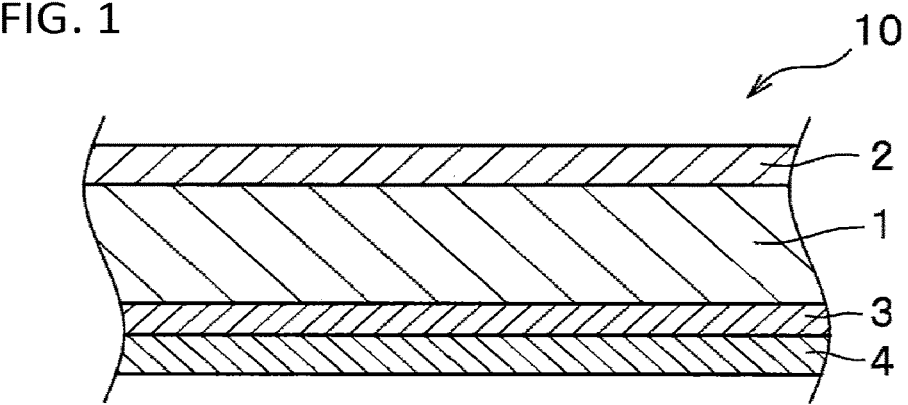
FIG. 1 is a cross-sectional view of an aluminum alloy brazing sheet in an embodiment of the present invention.

As illustrated in FIG. 1, the brazing sheet in the present embodiment includes a core material 1, a sacrificial material 2 provided on one surface of the core material 1, a brazing filler material 4 provided on the other surface side of the core material 1, and an intermediate layer 3 provided between the core material 1 and the brazing filler material 4. That is, a brazing sheet 10 in the present embodiment has a four-layer configuration.

In the brazing sheet 10 in the present embodiment, contents of components of the core material 1, the sacrificial material 2, and the intermediate layer 3 are appropriately specified.

Hereinafter, the reason why the components of the core material, the sacrificial material, and the intermediate layer of the brazing sheet in the present embodiment are numerically limited is described in detail.

[Core Material]

The core material of the brazing sheet in the present embodiment contains Si, Mn, Cu, and Mg, with the remainder being Al and unavoidable impurities.

The core material of the brazing sheet in the present embodiment may further contain one or more kinds of Ti, Cr, and Zr.

(Si in Core Material: 0.30 Mass % or More and 1.00 Mass % or Less)

Si improves post-brazing strength by being dissolved in a base material or forming an Al—Mn—Si intermetallic compound together with Mn. In addition, Si improves the post-brazing strength together with Mg. In a case where a content of Si is less than 0.30 mass %, the effect of improving the strength is small. On the other hand, in a case where the content of Si is more than 1.00 mass %, a solidus temperature decreases, and melting may occur during brazing.

Therefore, the content of Si is 0.30 mass % or more and 1.00 mass % or less.

The content of Si is preferably 0.40 mass % or more, and more preferably 0.50 mass % or more, from the viewpoint of improving the post-brazing strength. The content of Si is preferably 0.80 mass % or less, and more preferably 0.70 mass % or less, from the viewpoint of avoiding the occurrence of melting during brazing.

(Mn in Core Material: 0.50 Mass % or More and 2.00 Mass % or Less)

Mn improves the post-brazing strength by being dissolved in the base material or forming an Al—Mn—Si intermetallic compound together with Si. In a case where a content of Mn is less than 0.50 mass %, the effect of improving the strength is small. On the other hand, in a case where the content of Mn is more than 2.00 mass %, the intermetallic compound is precipitated coarsely, and a rollability is lowered, which makes it difficult to produce a brazing sheet.

Therefore, the content of Mn is 0.50 mass % or more and 2.00 mass % or less.

The content of Mn is preferably 0.80 mass % or more, and more preferably 1.20 mass % or more, from the viewpoint of improving the post-brazing strength. In addition, the content of Mn is preferably 1.80 mass % or less, and more preferably 1.60 mass % or less, from the viewpoint of preventing deterioration of the rollability.

(Cu in Core Material: 0.60 Mass % or More and 1.20 Mass % or Less)

Cu is dissolved in a base material after brazing, and improves the post-brazing strength. In a case where a content of Cu is less than 0.60 mass %, the effect of improving the strength is small. On the other hand, in a case where the content of Cu is more than 1.20 mass %, the solidus temperature decreases, and melting may occur during brazing.

Therefore, the content of Cu is 0.60 mass % or more and 1.20 mass % or less.

The content of Cu is preferably 0.80 mass % or more, and more preferably 0.90 mass % or more, from the viewpoint of improving the post-brazing strength. In addition, the content of Cu is preferably 1.10 mass % or less from the viewpoint of avoiding the occurrence of melting during brazing.

(Mg in Core Material: 0.05 Mass % or More and 0.80 Mass % or Less)

Mg improves the post-brazing strength by an interaction with Si. In a case where a content of Mg is less than 0.05 mass %, the effect of improving the strength is small. On the other hand, in a case where the content of Mg is more than 0.80 mass %, Mg reacts with a flux used for brazing, and the brazing property significantly deteriorates.

Therefore, the content of Mg is 0.05 mass % or more and 0.80 mass % or less.

The content of Mg is preferably 0.30 mass % or more, and more preferably 0.40 mass % or more, from the viewpoint of improving the post-brazing strength. The content of Mg is preferably 0.70 mass % or less from the viewpoint of avoiding deterioration of the brazing property.

(Ti in Core Material: 0.30 Mass % or Less)

As is generally common, Ti is distributed in layers in an aluminum alloy, which causes a potential distribution of a brazing sheet to be a distribution corresponding to a density of Ti, so that a corrosion form is layered to reduce a speed of corrosion progress in a plate thickness direction. Therefore, Ti contributes to an improvement in corrosion resistance. However, in a case where a content of Ti is more than 0.30 mass %, a coarse $Al_3Ti$ intermetallic compound is likely to form during casting, and workability deteriorates, and thus cracking is likely to generate during tube shaping.

Therefore, in the case where Ti is contained, the content of Ti is 0.30 mass % or less.

(Cr in Core Material: 0.30 Mass % or Less)

As is generally common, Cr forms $Al_3Cr$ dispersed particles with Al and strengthens dispersion to improve the post-brazing strength. However, in a case where a content of Cr is more than 0.30 mass %, a coarse $Al_3Cr$ intermetallic compound is formed, and the rollability deteriorates.

Therefore, in the case where Cr is contained, the content of Cr is 0.30 mass % or less.

(Zr in Core Material: 0.30 Mass % or Less)

As is generally common, Zr forms $Al_3Zr$ dispersed particles with Al and strengthens dispersion to improve the post-brazing strength. However, in a case where a content of Zr is more than 0.30 mass %, a coarse $Al_3Zr$ intermetallic compound is formed, and workability deteriorates, and thus cracking is likely to occur during tube shaping.

Therefore, in the case where Zr is contained, the content of Zr is 0.30 mass % or less.

As long as the contents of Ti, Cr, and Zr described above do not exceed the upper limit described above, the effects of the present invention are not naturally impaired when one or more kinds of Ti, Cr, and Zr are contained in the core material, that is, not only when one kind thereof is contained, but also when two or more kinds thereof are contained.

(Remainder in Core Material: Al and Unavoidable Impurities)

The remainder of the core material of the brazing sheet in the present embodiment is Al and unavoidable impurities. The unavoidable impurities are impurities that are inevitably mixed when raw materials are melted, and for example, V, Ni, Ca, Na, Sr, Li, Mo, Zn, Sn, In, and the like may be contained within a range that does not impair the effects of the present invention.

Specifically, each of V, Ni, Ca, Na, Sr, Li, Mo, Zn, Sn, and In does not impair the effects of the present invention as long as it is within a range of 0.05 mass % or less. As long as the content of each of these components is not more than the predetermined content, the effects of the present invention are not impaired not only when these components are contained as unavoidable impurities but also when these components are positively added.

In addition, Ti, Cr, and Zr described above may also be contained as unavoidable impurities, and the content in this case is, for example, 0.1 mass % or less for each, and 0.3 mass % or less in total.

[Sacrificial Material]

The sacrificial material of the brazing sheet in the present embodiment contains Si, Zn, and Mn, with the remainder being Al and unavoidable impurities.

The sacrificial material of the brazing sheet in the present embodiment may further contain one or more kinds of Ti, Cr, and Zr.

(Si in Sacrificial Material: 0.10 Mass % or More and 1.20 Mass % or Less)

Si improves the strength of the sacrificial material. In a case where a content of Si is less than 0.10 mass %, the effect of improving the strength is small. On the other hand, in a case where the content of Si is more than 1.20 mass %, the solidus temperature decreases, and melting may occur during brazing.

Therefore, the content of Si is 0.10 mass % or more and 1.20 mass % or less.

The content of Si is preferably 0.30 mass % or more, more preferably 0.40 mass % or more, and still more preferably 0.60 mass % or more, from the viewpoint of improving the strength. The content of Si is preferably 1.00 mass % or less, and more preferably 0.90 mass % or less, from the viewpoint of avoiding the occurrence of melting during brazing.

(Zn in Sacrificial Material: 2.00 Mass % or More and 7.00 Mass % or Less)

Zn prevents pitting corrosion and crevice corrosion by lowering the potential of the base material and enhancing a sacrificial protection effect for the core material and the intermediate layer. In a case where a content of Zn is less than 2.00 mass %, the effect of sacrificial protection is small. On the other hand, in a case where the content of Zn is more than 7.00 mass %, the self-corrosiveness of the sacrificial material is excessively increased, and the corrosion resistance of the entire brazing sheet is lowered.

Therefore, the content of Zn is 2.00 mass % or more and 7.00 mass % or less.

The content of Zn is preferably 3.00 mass % or more, and more preferably 4.00 mass % or more, from the viewpoint of enhancing the sacrificial protection effect. The content of Zn is preferably 6.00 mass % or less, and more preferably 5.00 mass % or less, from the viewpoint of avoiding deterioration of the corrosion resistance.

(Mn in Sacrificial Material: 0.40 Mass % or Less)

Mn improves the post-brazing strength by being dissolved in the base material or forming an Al—Mn—Si intermetallic compound together with Si. In addition, the fluidity of a molten brazing filler on a surface of the sacrificial material is greatly affected. Specifically, in a case where the content of Mn is 0.40 mass % or less, the fluidity of the molten brazing filler on the surface of the sacrificial material during brazing is significantly increased, and the brazing property can be significantly improved.

Therefore, the content of Mn is 0.40 mass % or less.

The content of Mn is preferably 0.30 mass % or less, more preferably 0.20 mass % or less, 0.10 mass % or less, 0.03 mass % or less, and 0.01 mass % or less, from the viewpoint of improving the brazing property.

On the other hand, the lower limit of the content of Mn is not particularly limited, and may be 0 mass %.

Since the content of Mn in the sacrificial material of the brazing sheet in the present embodiment is limited to be equal to or less than the predetermined value, the strength of the sacrificial material itself is slightly reduced. However, the strength of the entire brazing sheet can be ensured by specifying each of the contents of Mg, Si, Mn, and Cu in the core material in detail within the predetermined ranges.

(Ti, Cr, Zr in Sacrificial Material: 0.30 Mass % or Less)

Each of Ti, Cr, and Zr in the sacrificial material exhibits the same behavior as that of Ti, Cr, and Zr in the core material described above, and in the case where these elements are contained in the sacrificial material, the content of each of Ti, Cr, and Zr is 0.30 mass % or less.

As long as Ti, Cr, and Zr described above do not exceed the upper limit described above, the effect of the present invention is naturally not impaired when one or more kinds of Ti, Cr, and Zr are contained in the sacrificial material, that is, not only when one kind thereof is contained, but also when two or more kinds thereof are contained.

(Remainder of Sacrificial Material: Al and Unavoidable Impurities)

The remainder of the sacrificial material of the brazing sheet in the present embodiment is Al and unavoidable impurities. The unavoidable impurities are impurities that are inevitably mixed when raw materials are melted, and for example, V, Ni, Ca, Na, Sr, Li, Mo, Zn, Sn, In, and the like may be contained within a range that does not impair the effects of the present invention.

Specifically, each of V, Ni, Ca, Na, Sr, Li, Mo, Zn, Sn, and In does not impair the effects of the present invention as long as it is within a range of 0.05 mass % or less. As long as the content of each of these components is not more than the predetermined content, the effects of the present invention are not impaired not only when these components are contained as unavoidable impurities but also when these components are positively added.

In addition, Mn, Ti, Cr, and Zr described above may also be contained as unavoidable impurities, and in this case, the content is, for example, 0.1 mass % or less for each, and 0.3 mass % or less in total.

[Intermediate Layer]

The intermediate layer of the brazing sheet in the present embodiment contains Si, Mn, and Cu, with the remainder being Al and unavoidable impurities.

The intermediate layer of the brazing sheet in the present embodiment may contain Mg, and may further contain one or more kinds of Ti, Cr, and Zr.

(Si in Intermediate Layer: 0.05 Mass % or More and 1.20 Mass % or Less)

Si improves the post-brazing strength by being dissolved in the base material or forming an Al—Mn—Si intermetallic compound together with Mn. In a case where a content of Si is less than 0.05 mass %, the effect of improving the strength is small. On the other hand, in a case where the content of Si is more than 1.20 mass %, the solidus temperature decreases, and melting may occur during brazing.

Therefore, the content of Si is 0.05 mass % or more and 1.20 mass % or less.

The content of Si is preferably 0.30 mass % or more, more preferably 0.50 mass % or more, and still more preferably 0.70 mass % or more, from the viewpoint of improving the post-brazing strength. The content of Si is preferably 1.10 mass % or less, and more preferably 1.00 mass % or less, from the viewpoint of avoiding the occurrence of melting during brazing.

(Mn in Intermediate Layer: 0.50 Mass % or More and 2.00 Mass % or Less)

Mn improves the post-brazing strength by being dissolved in the base material or forming an Al—Mn—Si intermetallic compound together with Si. In a case where a content of Mn is less than 0.50 mass %, the effect of improving the strength is small. On the other hand, in a case where the content of Mn is more than 2.00 mass %, the intermetallic compound is precipitated coarsely, and the rollability is lowered, which makes it difficult to produce a brazing sheet.

Therefore, the content of Mn is 0.50 mass % or more and 2.00 mass % or less.

The content of Mn is preferably 0.80 mass % or more, and more preferably 1.20 mass % or more, from the viewpoint of improving the post-brazing strength. In addition, the content of Mn is preferably 1.80 mass % or less, and more preferably 1.60 mass % or less, from the viewpoint of preventing deterioration of the rollability.

(Cu in the Intermediate Layer: 0.10 Mass % or More and 1.20 Mass % or Less)

Cu is dissolved in the base material after brazing, and improves the post-brazing strength. In a case where a content of Cu is less than 0.10 mass %, the effect of improving the strength is small. On the other hand, in a case where the content of Cu is more than 1.20 mass %, the solidus temperature decreases, and melting may occur during brazing.

Therefore, the content of Cu is 0.10 mass % or more and 1.20 mass % or less.

The content of Cu is preferably 0.60 mass % or more, more preferably 0.80 mass % or more, and still more preferably 0.90 mass % or more, from the viewpoint of improving the post-brazing strength. The content of Cu is preferably 1.10 mass % or less, and more preferably 1.00 mass % or less, from the viewpoint of avoiding the occurrence of melting during brazing.

(Mg in Intermediate Layer: 0.20 Mass % or Less)

Mg improves the post-brazing strength by an interaction with Si. However, in a case where the content of Mg is more than 0.20 mass %, the amount of Mg diffused from the intermediate layer into the brazing filler material during brazing heating increases, and a large number of reactions with the flux used for brazing occur, resulting in a significant deterioration of the brazing property.

Therefore, in the case where Mg is contained, the content of Mg is 0.20 mass % or less.

(Ti, Cr, and Zr in Intermediate Layer: 0.30 Mass % or Less)

Each of Ti, Cr, and Zr in the intermediate layer exhibits the same behavior as that of Ti, Cr, and Zr in the core material described above, and in the case where these elements are contained in the intermediate layer, the content of each of Ti, Cr, and Zr is 0.30 mass % or less.

As long as Ti, Cr, and Zr described above do not exceed the upper limit described above, the effect of the present invention is naturally not impaired when one or more kinds of Ti, Cr, and Zr are contained in the intermediate layer, that is, not only when one kind thereof is contained, but also when two or more kinds thereof are contained.

(Remainder in Intermediate Layer: Al and Unavoidable Impurities)

The remainder of the intermediate layer of the brazing sheet in the present embodiment is Al and unavoidable impurities. The unavoidable impurities are impurities that are inevitably mixed when raw materials are melted, and for example, V, Ni, Ca, Na, Sr, Li, Mo, Zn, Sn, In, and the like may be contained within a range that does not impair the effects of the present invention.

Specifically, each of V, Ni, Ca, Na, Sr, Li, Mo, Zn, Sn, and In does not impair the effects of the present invention as long as it is within a range of 0.05 mass % or less. As long as the content of each of these components is not more than the predetermined content, the effects of the present invention are not impaired not only when these components are contained as unavoidable impurities but also when these components are positively added.

In addition, Mg, Ti, Cr, and Zr described above may also be contained as unavoidable impurities, and the content in this case is, for example, 0.1 mass % or less for each, and 0.3 mass % or less in total.

[Brazing Filler Material]

The brazing filler material of the brazing sheet in the present embodiment is made of, for example, an Al—Si alloy. Examples of the Al—Si alloy include general JIS alloys such as 4343 and 4045 specified in JIS Z3263:2002. As the Al—Si alloy, for example, an Al—Si alloy containing 5 mass % or more and 15 mass % or less (preferably 7 mass % or more and 13 mass % or less) of Si can be used. However, the content of Si is not limited to this range. The brazing filler material may have a common component composition that can exhibit a function as a brazing filler material, and may be an Al—Si—Zn alloy or the like. In addition, other elements may be contained.

[Applications]

The brazing sheet in the present embodiment can be used as, for example, a member of an automobile heat exchanger, for example, a tube material of a radiator, or the like.

[Thickness and Cladding Ratio]

The thickness of the brazing sheet in the present embodiment is not particularly limited, and is, for example, 0.35 mm or less (preferably 0.1 mm or more and 0.25 mm or less) in consideration of being applied to a member of an automobile heat exchanger.

A cladding ratio of each member of the brazing sheet in the present embodiment (a ratio of the thickness of each member when the total thickness of the brazing sheet is 100%) is not particularly limited, and for example, the cladding ratio of the brazing filler material is 5% or more and 25% or less (preferably 10% or more and 20% or less), the cladding ratio of the intermediate layer is 5% or more and 25% or less (preferably 7% or more and 20% or less), and the cladding ratio of the sacrificial material is 5% or more and 25% or less (preferably 10% or more and 20% or less).

[Method for Producing Brazing Sheet]

A method for producing the brazing sheet in the present embodiment is not particularly limited, and the brazing sheet is produced by, for example, a common method for producing a clad material. An example thereof is described below.

First, an aluminum alloy having a component composition of a core material, a sacrificial material, a brazing filler material, or an intermediate layer is melted and cast, followed by being subjected to surface milling (a surface smoothing treatment of an ingot) as necessary, and a homogenization treatment, thereby obtaining ingots. Then, the ingots of the sacrificial material, the brazing filler material, or the intermediate layer are subjected to hot rolling or mechanical slicing to have a predetermined thickness, followed by being combined with the ingot of the core material, and hot rolling is performed in accordance with a common method to form a clad material. Thereafter, the clad material is subjected to cold rolling, intermediate annealing as necessary, and final cold rolling, and is subjected to final annealing as necessary.

The homogenization treatment is preferably performed at 400 to 610° C. for 1 to 20 hours, and the intermediate annealing is preferably performed at 200 to 450° C. for 1 to 20 hours. The final annealing is preferably performed at 150 to 450° C. for 1 to 20 hours. In the case where the final annealing is performed, the intermediate annealing can be omitted. The tempering treatment may be any of H1n, H2n, and H3n (JIS H0001: 1998).

Although the method for producing the aluminum alloy brazing sheet in the present embodiment is as described above, common conditions may be used for the conditions not explicitly described in each step, and it is needless to say that the conditions can be appropriately changed as long as the effects obtained by the treatments in the above steps are exhibited.

Examples

Next, the aluminum alloy brazing sheet in the present invention is specifically described with reference to the comparison between Examples satisfying the requirements of the present invention and Comparative Examples not satisfying the requirements of the present invention.
[Preparation of Test Sample]

According to the production method shown above as the present embodiment, an aluminum alloy having a component composition shown in Tables 1 to 4 was subjected to casting, a homogenization treatment, and hot rolling (or slicing), and the brazing filler material-intermediate layer-core material-sacrificial material were overlapped with each other, followed by having been subjected to hot rolling, cold rolling, and final annealing, thereby preparing a test sample (brazing sheet) having a thickness of 0.2 mm.

TABLE 1

| Core material | Composition of core material (mass %) ※ | | | |
|---|---|---|---|---|
| No. | Si | Mn | Cu | Mg |
| A1 | 0.55 | 1.27 | 0.90 | 0.45 |
| A2 | 0.50 | 1.26 | 0.90 | 0.56 |
| A3 | 0.58 | 1.33 | 0.90 | 0.50 |
| A4 | 0.50 | 1.33 | 0.91 | 0.61 |
| A5 | 0.55 | 1.27 | 0.91 | 0.46 |
| A6 | 0.58 | 1.24 | 1.10 | 0.47 |
| A7 | 0.60 | 1.41 | 1.03 | 0.43 |
| A8 | 0.68 | 1.42 | 1.02 | 0.43 |
| A9 | 0.67 | 1.43 | 1.02 | 0.41 |
| A10 | 0.57 | 1.32 | 0.87 | 0.48 |

TABLE 1-continued

| Core material | Composition of core material (mass %) ※ | | | |
|---|---|---|---|---|
| No. | Si | Mn | Cu | Mg |
| A11 | 0.53 | 1.40 | 0.79 | 0.30 |
| A12 | 0.57 | 1.39 | 0.84 | 0.37 |

※ Remainder: Al and unavoidable impurities

TABLE 2

| Intermediate | Composition of intermediate layer (mass %) ※ | | | |
|---|---|---|---|---|
| layer No. | Si | Mn | Cu | Mg |
| B1 | 0.79 | 1.59 | 0.81 | 0.00 |
| B2 | 0.79 | 1.56 | 0.80 | 0.12 |
| B3 | 0.83 | 1.58 | 0.80 | 0.18 |
| B4 | 0.94 | 1.62 | 0.97 | 0.00 |
| B5 | 0.83 | 1.52 | 0.82 | 0.00 |
| B6 | 0.10 | 1.62 | 0.92 | 0.00 |
| B7 | 0.21 | 1.63 | 0.95 | 0.00 |
| B8 | 0.83 | 1.52 | 0.82 | 0.00 |

※ Remainder: Al and unavoidable impurities

TABLE 3

| Sacrificial material | Composition of sacrificial material (mass %) ※ | | |
|---|---|---|---|
| No. | Si | Zn | Mn |
| C1 | 0.59 | 4.11 | 0.02 |
| C2 | 0.59 | 4.09 | 0.01 |
| C3 | 0.71 | 5.47 | 0.96 |
| C4 | 0.74 | 4.23 | 0.02 |
| C5 | 0.70 | 4.47 | 0.16 |
| C6 | 0.68 | 4.45 | 0.30 |
| C7 | 0.62 | 4.44 | 0.51 |
| C8 | 0.65 | 4.45 | 1.01 |
| C9 | 0.78 | 4.26 | 0.01 |

※ Remainder: Al and unavoidable impurities

TABLE 4

| Brazing filler material No. | Composition of brazing filler material (mass %) ※ Si |
|---|---|
| D1 | 11.70 |

※ Remainder: Al and unavoidable impurities

[Test Contents]
(Post-Brazing Strength Test)

The prepared test sample was cut into a required size, subjected to a heat treatment equivalent to brazing in which the test sample was held within a temperature range of 577° C. or higher for 7 to 8 minutes in a nitrogen atmosphere, and then the test sample was held at room temperature for 7 days. The test sample was used to prepare a No. 13B test piece in accordance with JIS Z2241:2011, and a tensile strength of the No. 13B test piece was measured using a tensile tester. The test was performed with a crosshead speed of 5 mm/min until a 0.2% proof stress was reached, and then, the test was performed with a crosshead speed of 20 mm/min until the test piece was broken.

As for the "post-brazing strength", the case of 190 MPa or more was determined to be acceptable.
(Brazing Property: Gap Filling Test)

Figure 2A:
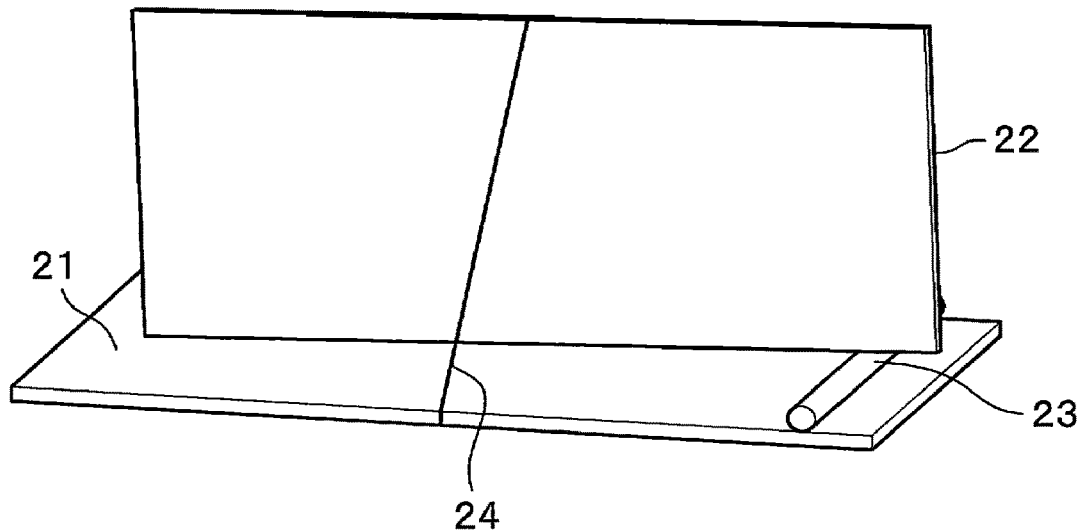
FIG. 2A is a view for illustrating a gap filling test, and is a perspective view of a state in which a lower plate and an upper plate are combined.
Figure 2B:
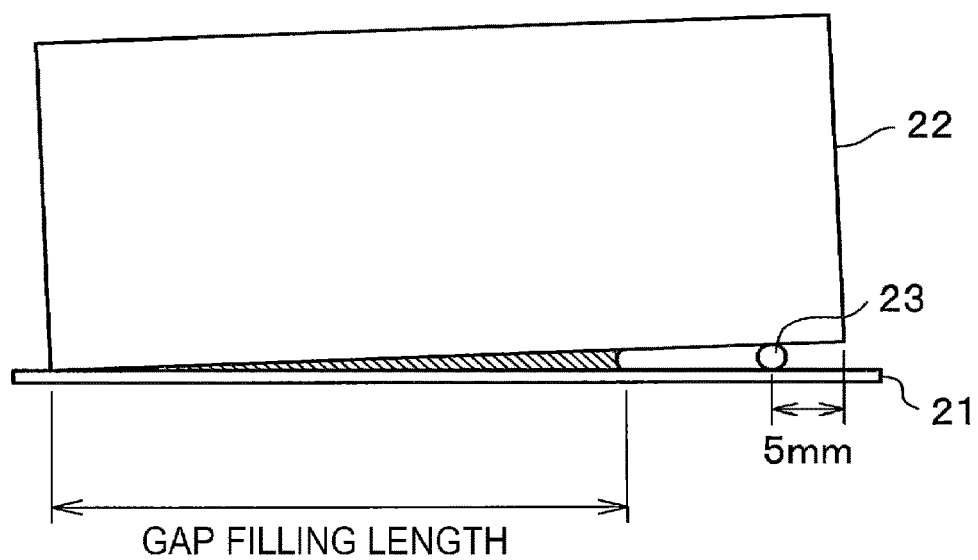
FIG. 2B is a view for illustrating the gap filling test, and is a side view of a state in which the lower plate and the upper plate are combined.

A prepared test sample was cut into a size of 25 mm×55 mm to obtain a test piece. Then, after a fluoride-based flux was applied to a surface of a brazing filler material of the test piece (test sample), a stainless steel spacer 23 having a diameter of 2 mm was interposed between a lower plate 21 as the test piece and an upper plate 22, and the plates were fixed using a wire 24 with a certain clearance, as shown in FIG. 2A and FIG. 2B. Then, the test piece in this state was held within a temperature range of 577° C. or higher for 3 to 4 minutes in a nitrogen atmosphere, and then a gap filling length was measured. The maximum ultimate temperature of brazing was set to be equal to or lower than the melting temperature of the test sample.

The lower plate 21 being the test piece in FIG. 2A and FIG. 2B was disposed such that a brazing filler material faced an upper side. As the upper plate 22 in FIG. 2A and FIG. 2B, an aluminum alloy plate having a thickness of 1 mm and an alloy number 3003 specified in JIS Z3263:2002 was used.

As for the "brazing property of the surface of the brazing filler material" indicated by the result of the gap filling test, the case of 15 mm or more was determined to be acceptable.
(Brazing Property: Brazing Filler Spreading Test)

Figure 3A:
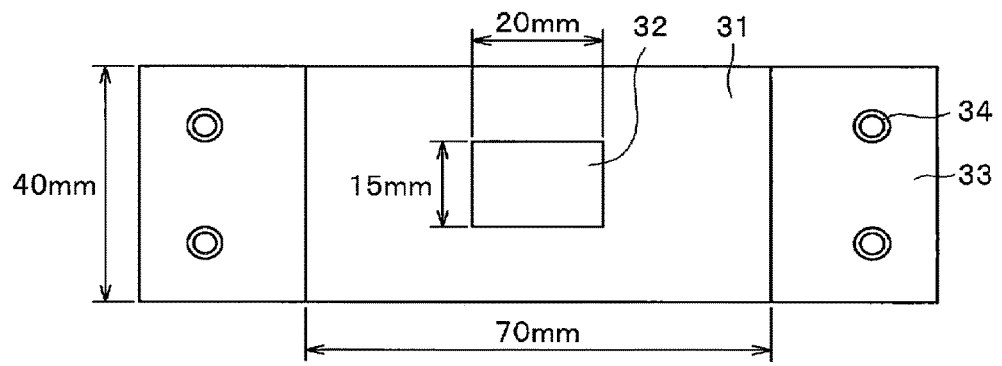
FIG. 3A is a view for illustrating a brazing filler spreading test, and is a top view of a state in which an upper plate is placed on a lower plate. This figure shows a state in which an upper stainless steel plate is removed.
Figure 3B:
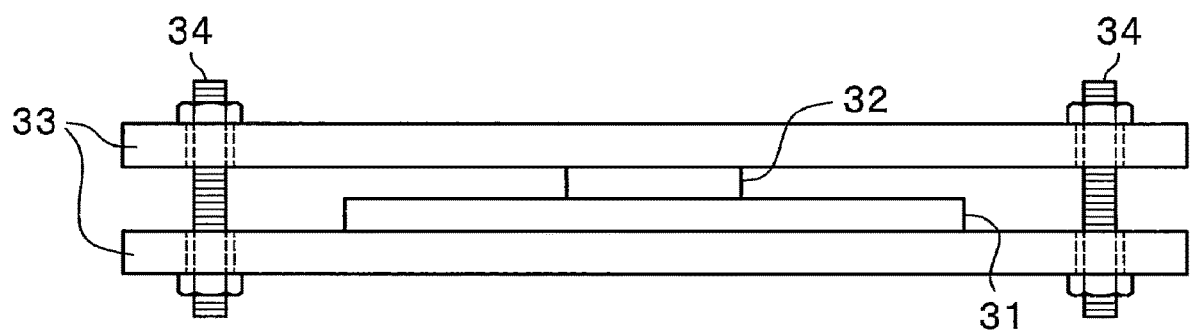
FIG. 3B is a view for illustrating a brazing filler spreading test, and is a side view of a state in which the upper plate is placed on the lower plate.

A prepared test sample was cut into a size of 40 mm×70 mm to obtain a test piece. Then, as shown in FIG. 3A and FIG. 3B, a lower plate 31 as the test piece (test sample) and an upper plate 32, were fixed using two stainless steel plates 33 and fixtures 34 (bolts and nuts), and were held within a temperature range of 577° C. or higher for 2 to 3 minutes in a nitrogen atmosphere, and then, a spreading area of a brazing filler (=an area of the brazing filler that spreads from a region of 15 mm×20 mm of the upper plate 32 in the top view) was measured. The maximum ultimate temperature of brazing was set to be equal to or lower than the melting temperature of the test sample.

Specifically, the lower plate 31 being the test piece in FIG. 3A and FIG. 3B was disposed such that the sacrificial material faced the upper side. In addition, the upper plate 32 in FIG. 3A and FIG. 3B was a brazing sheet including an Al—Si brazing filler material, and was disposed such that the brazing filler material of the upper plate 32 was contact with the sacrificial material of the lower plate 31. Of course, brazing sheets having the same configuration were used as the upper plate 32 used in the brazing filler spreading test of each test piece.

The two stainless plates 33 and the fixtures 34 in FIG. 3B were used for preventing positional deviation between the lower plate 31 and the upper plate 32 during holding.

In a case where the holding time in the heated state in the tests described above is equal to or longer than the predetermined time, the numerical value of the strength does not greatly vary, and a situation in which the state of the molten brazing filler greatly changes is not assumed. Therefore, the results are not greatly affected as long as the holding time in the post-brazing strength test, the gap filling test, and the brazing filler spreading test is equal to or longer than 2 minutes.

As for the "brazing property of the surface of the sacrificial material" indicated by the results of the brazing filler spreading test, the case of 130 mm$^2$ or more was determined to be acceptable.

The results are shown in Table 5. In Table 5, numerical values of items that do not satisfy the requirements of the present invention are underlined, and items that are not evaluated are indicated by "-" in a column of evaluation items.

TABLE 5

| Test sample No. | Brazing filler material No. | Intermediate layer No. | Core material No. | Sacrificial material No. | Cladding ratio | | | | Evaluation item | | |
|---|---|---|---|---|---|---|---|---|---|---|---|
| | | | | | Brazing filler material | Intermediate layer | Core material | Sacrificial material | Post-brazing strength (MPa) | Gap filling test (mm) | Brazing filler spreading test (mm$^2$) |
| 1 | D1 | B1 | A1 | C1 | 19.2 | 9.7 | 53.7 | 17.4 | 223 | 23.9 | 179 |
| 2 | D1 | B1 | A1 | C1 | 19.5 | 11.4 | 54.4 | 14.7 | 226 | 25.7 | 213 |
| 3 | D1 | B1 | A2 | C2 | 16.4 | 10.4 | 54.5 | 18.7 | 223 | 22.2 | — |
| 4 | D1 | B1 | A2 | C2 | 16.9 | 10.3 | 53.4 | 19.4 | 221 | 21.4 | — |
| 5 | D1 | B1 | A3 | C2 | 14.9 | 8.7 | 61.7 | 14.7 | 236 | 21.7 | — |
| 6 | D1 | B1 | A4 | C2 | 12.6 | 8.8 | 61.8 | 16.8 | 235 | 19.9 | — |
| 7 | D1 | B2 | A5 | C1 | 18.1 | 11.1 | 53.5 | 17.3 | 223 | 19.8 | — |
| 8 | D1 | B3 | A3 | C2 | 13.8 | 7.8 | 62.7 | 15.7 | — | 16.5 | — |
| 9 | D1 | B4 | A6 | C3 | 13.1 | 9.4 | 61.9 | 15.6 | 248 | 21.6 | 64 |
| 10 | D1 | B5 | A7 | C4 | 17.2 | 10.1 | 58.3 | 14.4 | 237 | 25.0 | 286 |
| 11 | D1 | B5 | A8 | C5 | 17.7 | 9.2 | 60.2 | 12.9 | 241 | 23.6 | 167 |
| 12 | D1 | B5 | A8 | C6 | 18.1 | 9.5 | 58.8 | 13.6 | 235 | 25.2 | 186 |
| 13 | D1 | B5 | A9 | C7 | 17.9 | 9.4 | 58.4 | 14.3 | 244 | 25.0 | 116 |
| 14 | D1 | B5 | A9 | C8 | 17.0 | 9.4 | 58.8 | 14.8 | 235 | 22.4 | 70 |
| 15 | D1 | B6 | A10 | C9 | 21.2 | 11.2 | 49.4 | 18.2 | 222 | 31.9 | 292 |
| 16 | D1 | B7 | A10 | C9 | 22.4 | 10.9 | 49.8 | 16.9 | 222 | 29.0 | 201 |
| 17 | D1 | B8 | A11 | C4 | 13.2 | 9.6 | 62.7 | 14.5 | 207 | 26.7 | — |
| 18 | D1 | B8 | A12 | C4 | 15.2 | 12.0 | 55.0 | 17.8 | 214 | 27.2 | — |

[Discussion of Results]

As shown in Tables 1 to 5, No. 1 to No. 8, No. 10 to No. 12, and No. 15 to No. 18 are test samples satisfying the component compositions specified in the present invention.

As for No. 1 to No. 7, No. 10 to No. 12, and No. 15 to No. 18, the component compositions specified in the present invention were satisfied, so that the post-brazing strength was at a sufficiently high level.

As for No. 8, the post-brazing strength test was not performed, but it is presumed that a numerical value higher than the post-brazing strength of No. 5 can be obtained for No. 8 since compositions of the core material, the brazing filler material, and the sacrificial material in No. 8 are the same as those of No. 5, and the content of Mg in the intermediate layer of No. 8 is more than that of No. 5.

Since No. 1 to No. 8, No. 10 to No. 12, and No. 15 to No. 18 satisfied the component compositions specified in the present invention, preferable results were obtained in the gap filling test.

Since No. 1 and No. 2, No. 10 to No. 12, No. 15 and No. 16 satisfied the component compositions specified in the present invention, preferable results were obtained in the brazing filler spreading test.

As for No. 3 to No. 8, No. 17 and No. 18, the brazing filler spreading test was not performed. However, No. 3 to No. 8 contained the same sacrificial material as No. 1 and No. 2 or substantially the same sacrificial material (a sacrificial material having a lower content of Mn), and No. 17 and No. 18 contained the same sacrificial material as No. 10. Therefore, it is presumed that the fluidity of the molten brazing filler on surfaces of the sacrificial materials of No. 3 to No. 8 is about the same as those of No. 1 and No. 2, and as a result, the spreading area of the brazing filler is also about the same as those of No. 1 and No. 2. It is presumed that the fluidity of the molten brazing filler on surfaces of the sacrificial materials of No. 17 and No. 18 is about the same as that of No. 10, and as a result, the spreading area of the brazing filler is also about the same as that of No. 10.

From these results, it was confirmed that, when the brazing sheet satisfied the component compositions specified in the present invention, the brazing sheet was excellent not only in the "post-brazing strength" but also in the "brazing property" (brazing property of the surface of the brazing filler material indicated by the results of the gap filling test and the brazing property of the surface of the sacrificial material indicated by the results of the brazing filler spreading test), and both of them could be achieved at a high level.

On the other hand, as for No. 9, No. 13, and No. 14, the content of Mn in the sacrificial material was large, so that the molten brazing filler on the surface of the sacrificial material did not flow, and a desired level was not reached in the brazing filler spreading test. That is, No. 9, No. 13, and No. 14 were evaluated to be inferior in the brazing property.

Data of each test sample was plotted on a graph in which a horizontal axis represents an "amount of Mn (mass %) in the sacrificial material" and a vertical axis represents a "spreading area (mm$^2$) of the brazing filler" as a result of the brazing filler spreading test, and as a result, it was confirmed that there was a strong correlation between the two (indices of the vertical axis and the horizontal axis). Specifically, it was confirmed on the graph that the "spreading area (mm$^2$) of the brazing filler" increased as the "amount (mass %) of Mn in the sacrificial material" decreased.

Therefore, based on this result, it has become clear that the thought of the present inventors that the brazing property (brazing property of the surface of the sacrificial material) can be improved by reducing the amount of Mn in the sacrificial material is correct.

Although various embodiments have been described above with reference to the drawings, it is needless to say that the present invention is not limited to these examples. It will be apparent to those skilled in the art that various changes and modifications may be conceived within the scope of the claims. It is also understood that the various changes and modifications belong to the technical scope of the present invention. Components in the embodiments described above may be combined freely within a range not departing from the spirit of the present invention.

This application is based on Japanese Patent Application No. 2020-017456 filed on Feb. 4, 2020 and Japanese Patent Application No. 2020-184647 filed on Nov. 4, 2020.

REFERENCE SIGN LIST

1 Core material
2 Sacrificial material
3 Intermediate layer
4 Brazing filler material
10 Brazing sheet

The invention claimed is:

1. An aluminum alloy brazing sheet comprising:
a core material;
a sacrificial material provided on one surface of the core material;
a brazing filler material provided on the other surface side of the core material; and
an intermediate layer provided between the core material and the brazing filler material,
wherein the core material comprises from 0.30 mass % to 1.00 mass % of Si, from 0.50 mass % to 2.00 mass % of Mn, from 0.60 mass % to 1.20 mass % of Cu, from 0.05 mass % to 0.80 mass % of Mg, and Al,
the sacrificial material comprises from 0.10 mass % to 1.20 mass % of Si, from 2.00 mass % to 7.00 mass % of Zn, from greater than 0 mass % to 0.20 mass % of Mn, and Al, and
the intermediate layer comprises from 0.05 mass % to 1.20 mass % of Si, from 0.50 mass % to 2.00 mass % of Mn, from 0.10 mass % to 1.20 mass % of Cu, and Al,
wherein when an Al—Si brazing filler material in an original size of 15 mm×20 mm is placed on the aluminum alloy brazing sheet in a size of 40 mm×70 mm such that the Al—Si brazing filler material contacts the sacrificial material of the aluminum alloy brazing sheet, and heated at a temperature of 577° C. or higher for 2 to 3 minutes in a nitrogen atmosphere, a spreading area of the Al—Si brazing filler material, which is an area of the Al—Si brazing filler material beyond the original size of the Al—Si brazing filler material, is greater than 130 mm$^2$.

2. The aluminum, alloy brazing sheet according to claim 1, wherein the intermediate layer further comprises 0.20 mass % or less of Mg.

3. The aluminum alloy brazing sheet according to claim 1, wherein the core material comprises at least 0.30 mass % of Mg.

4. The aluminum alloy brazing sheet according to claim 1, wherein the intermediate layer further comprises at least one selected from the group consisting of 0.30 mass % or less of Ti, 0.30 mass % or less of Cr, and 0.30 mass % or less of Zr.

5. The aluminum alloy brazing sheet according to claim 1, wherein the core material further comprises at least one selected from the group consisting of 0.30 mass % or less of Ti, 0.30 mass % or less of Cr, and 0.30 mass % or less of Zr.

6. The aluminum alloy brazing sheet according to claim 1, wherein the sacrificial material further comprises at least one selected from the group consisting of 0.30 mass % or less of Ti, 0.30 mass % or less of Cr, and 0.30 mass % or less of Zr.

7. The aluminum alloy brazing sheet according to claim 2, wherein the core material comprises at least 0.03 mass % of Mg.

8. The aluminum, alloy brazing sheet according to claim 2, wherein the intermediate layer further comprises at least one selected from the group consisting of 0.30 mass % or less of Ti, 0.30 mass % or less of Cr, and 0.30 mass % or less of Zr.

9. The aluminum alloy brazing sheet according to claim 2, wherein the core material further comprises at least one selected from the group consisting of 0.30 mass % or less of Ti, 0.30 mass % or less of Cr, and 0.30 mass % or less of Zr.

10. The aluminum alloy brazing sheet according to claim 2, wherein the sacrificial material further comprises at least one selected from the group consisting of 0.30 mass % or less of Ti, 0.30 mass % or less of Cr, and 0.30 mass % or less of Zr.

11. The aluminum alloy brazing sheet according to claim 1, wherein the brazing filler material comprises Si.

12. The aluminum alloy brazing sheet according to claim 1, wherein the brazing filler material comprises from 5 mass % to 15 mass % of Si, and Al.

13. The aluminum alloy brazing sheet according to claim 1, wherein the core material comprises from 0.40 mass % to 0.80 mass % of Si, from 0.80 mass % to 1.80 mass % of Mn, from 0.80 mass % to 1.10 mass % of Cu, from 0.30 mass % to 0.70 mass % of Mg, and Al,
the sacrificial material comprises from 0.30 mass % to 1.00 mass % of Si, from 3.00 mass % to 6.00 mass % of Zn, from greater than 0 mass % to 0.20 mass % of Mn, and Al,
the intermediate layer comprises from 0.30 mass % to 1.10 mass % of Si, from 0.80 mass % to 1.80 mass % of Mn, from 0.60 mass % to 1.10 mass % of Cu, and Al, and
the brazing filler material comprises from 5 mass % to 15 mass % of Si, and Al.

14. The aluminum alloy brazing sheet according to claim 1,
wherein the core material comprises from 0.50 mass % to 0.70 mass % of Si, from 1.20 mass % to 1.60 mass % of Mn, from 0.90 mass % to 1.10 mass % of Cu, from 0.40 mass % to 0.70 mass % of Mg, and Al,
the sacrificial material comprises from 0.40 mass % to 0.90 mass % of Si, from 4.00 mass % to 5.00 mass % of Zn, from greater than 0 mass % to 0.10 mass % of Mn, and Al,
the intermediate layer comprises from 0.50 mass % to 1.00 mass % of Si, from 1.20 mass % to 1.60 mass % of Mn, from 0.80 mass % to 1.00 mass of Cu, and Al, and
the brazing filler material comprises from 5 mass % to 15 mass % of Si, and Al.

15. The aluminum alloy brazing sheet according to claim 1, wherein the sacrificial material comprises from 0.59 mass % to 0.78 mass % of Si; and from 4.00 mass % to 5.47 mass % of Zn.

16. The aluminum alloy brazing sheet according to claim 1, wherein the sacrificial material comprises from greater than 0 mass % to 0.03 mass % of Mn.

17. The aluminum alloy brazing sheet according to claim 1, wherein the aluminum alloy brazing sheet has a post-brazing strength of at least 190 MPa, the post-brazing strength being a tensile strength of the aluminum alloy brazing sheet after being heated at a temperature of 577° C. or higher for 7 to 8 minutes in a nitrogen atmosphere and then held at room temperature for 7 days.

18. The aluminum alloy brazing sheet according to claim 1, wherein when a fluoride-based flux is applied to a surface of the brazing filler material of the aluminum alloy brazing sheet in a size of 25 mm×55 mm, an aluminum alloy plate having a thickness of 1 mm is placed on the surface of the brazing filler material via a stainless steel spacer having a diameter of 2 mm and fixed by a wire such that a clearance is formed between the aluminum alloy plate and the aluminum alloy brazing sheet, and the aluminum alloy brazing sheet, the aluminum alloy plate, and the stainless steel spacer fixed by the wire are heated at a temperature of 577° C. or higher for 3 to 4 minutes in a nitrogen atmosphere, the clearance is filled at a length of at least 15 mm.

19. An aluminum alloy brazing sheet comprising:
a core material;
a sacrificial material provided on one surface of the core material;
a brazing filler material provided on the other surface side of the core material; and
an intermediate layer provided between the core material and the brazing filler material,
wherein the core material comprises from 0.40 mass % to 0.80 mass % of Si, from 0.80 mass % to 1.80 mass % of Mn, from 0.80 mass % to 1.10 mass % of Cu, from 0.30 mass % to 0.70 mass % of Mg, and Al,
the sacrificial material comprises from 0.30 mass % to 1.00 mass % of Si, from 3.00 mass % to 6.00 mass % of Zn, from greater than 0 mass % to 0.20 mass % of Mn, and Al,
the intermediate layer comprises from 0.30 mass % to 1.10 mass % of Si, from 0.80 mass % to 1.80 mass % of Mn, from 0.60 mass % to 1.10 mass % of Cu, and Al, and
the brazing filler material comprises from 5 mass % to 15 mass % of Si and Al,
wherein when an Al—Si brazing filler material in an original size of 15 mm×20 mm is placed on the aluminum alloy brazing sheet in a size of 40 mm×70 mm such that the Al—Si brazing filler material contacts the sacrificial material of the aluminum alloy brazing sheet, and heated at a temperature of 577° C. or higher for 2 to 3 minutes in a nitrogen atmosphere, a spreading area of the Al—Si brazing filler material, which is an area of the Al—Si brazing filler material beyond the original size of the Al—Si brazing filler material, is greater than 130 mm².

* * * * *